(12) United States Patent
Davis et al.

(10) Patent No.: US 9,025,516 B2
(45) Date of Patent: May 5, 2015

(54) METHOD AND SYSTEM FOR OPTIMIZING DATA THROUGHPUT PERFORMANCE FOR DYNAMIC LINK CONDITIONS USING ADAPTIVE CODING AND MODULATION (ACM) AND DYNAMIC SINGLE CHANNEL PER CARRIER (DSCPC) TECHNIQUES

(75) Inventors: Wallace Davis, Scottsdale, AZ (US); Michael Beeler, Jefferson, MD (US)

(73) Assignee: Comtech EF Data Corp., Tempe, AZ (US)

( * ) Notice: Subject to any disclaimer, the term of this patent is extended or adjusted under 35 U.S.C. 154(b) by 432 days.

(21) Appl. No.: 13/416,973

(22) Filed: Mar. 9, 2012

(65) Prior Publication Data

US 2012/0170594 A1    Jul. 5, 2012

Related U.S. Application Data

(60) Provisional application No. 61/546,700, filed on Oct. 13, 2011.

(51) Int. Cl.
| | |
|---|---|
| *G01R 31/08* | (2006.01) |
| *H04L 5/00* | (2006.01) |
| *H04B 7/185* | (2006.01) |
| *H04L 1/00* | (2006.01) |

(52) U.S. Cl.
CPC .......... *H04L 5/0046* (2013.01); *H04B 7/18528* (2013.01); *H04L 1/0003* (2013.01); *H04L 1/0009* (2013.01); *H04L 2001/0097* (2013.01)

(58) Field of Classification Search
CPC ..... H04L 5/023; H04L 1/0025; H04L 5/0046; H04B 7/185; H04B 7/18523; H04B 7/18539; H04W 28/0236; H04W 28/18
See application file for complete search history.

(56) References Cited

U.S. PATENT DOCUMENTS

| | | | | |
|---|---|---|---|---|
| 5,499,265 | A  * | 3/1996  | Dixon et al.   | 375/150 |
| 5,982,813 | A  * | 11/1999 | Dutta et al.   | 375/219 |
| 6,115,411 | A  * | 9/2000  | van Driest     | 375/130 |
| 2001/0048709 | A1 | 12/2001 | Hoffmann et al. | |
| 2004/0125740 | A1 * | 7/2004  | Gardner        | 370/208 |
| 2004/0228283 | A1 * | 11/2004 | Naguib et al.  | 370/252 |
| 2006/0034165 | A1 * | 2/2006  | Levy           | 370/208 |
| 2006/0084406 | A1 * | 4/2006  | Strachan et al.| 455/334 |
| 2007/0076816 | A1 | 4/2007  | Hoffmann et al. | |
| 2009/0161783 | A1 * | 6/2009  | Ozluturk       | 375/260 |
| 2009/0180562 | A1 | 7/2009  | Mcfarland       | |
| 2009/0221317 | A1 * | 9/2009  | Agarwal et al. | 455/522 |
| 2011/0003543 | A1 | 1/2011  | Laufer         | |

* cited by examiner

*Primary Examiner* — Phirin Sam
(74) *Attorney, Agent, or Firm* — Booth Udall Fuller, PLC (57) ABSTRACT

A method of maintaining a data rate of a telecommunications link that involves, in a particular embodiment, modulating a carrier signal, encoding the carrier signal, and dynamically controlling a bandwidth of the carrier signal by changing a symbol rate of the carrier signal such that a data rate of the carrier signal remains substantially equal to a predetermined data rate when the carrier signal is transmitted to a remote receiver.

50 Claims, 9 Drawing Sheets

METHOD AND SYSTEM FOR OPTIMIZING DATA THROUGHPUT PERFORMANCE FOR DYNAMIC LINK CONDITIONS USING ADAPTIVE CODING AND MODULATION (ACM) AND DYNAMIC SINGLE CHANNEL PER CARRIER (DSCPC) TECHNIQUES

CROSS REFERENCE TO RELATED APPLICATIONS

This document claims the benefit of the filing date of U.S. Provisional Patent Application No. 61/546,700, entitled "A Method and System for Optimizing Data Throughput Performance for Dynamic Link Conditions using Adaptive Coding and Modulation (ACM) and Dynamic Single Channel per Carrier (dSCPC) Techniques" to Wallace Davis et al., which was filed on Oct. 31, 2011, the disclosure of which is hereby incorporated entirely by reference herein.

BACKGROUND

1. Technical Field

Aspects of this document relate generally to telecommunication systems and techniques for transmitting data across a telecommunication channel.

2. Background Art

Since the introduction of electromagnetic (EM) transmission, a recurring problem continuing to challenge the industry is overcoming changes in the transmission link due to weather, atmospheric, or man-made interference. Overcoming link conditions is a universal problem and is not solely limited to the satellite industry, but due to the extremely low-levels of power and frequencies involved, link degradation has a more profound effect on the quality of the received signal when link conditions are less than optimal. In the Very Small Aperture Terminal (VSAT) satellite industry, the number of links may be one (point-to-point) or more than one (point-to-multipoint), resulting in a diverse number of link conditions that may be experienced by a single network. Additionally, in VSAT networks, a pool or pools of bandwidth are allocated for the networks to utilize, so the need to dynamically monitor and control each link is required to ensure each link within a network meets an established level of performance. In the art, the level of acceptable performance is known as the Service Level Agreement (SLA).

Therefore, a need exists for a method that monitors and controls the links as is done in the prior art, while dynamically allocating bandwidth as needed from the available bandwidth pool to increase the bandwidth of one site or a group of sites and limiting another site or group of sites to ensure all sites assigned to a network meet or exceed their assigned SLA.

SUMMARY

Implementations of a method of maintaining a data rate of a telecommunications link may comprise modulating, using a modulator, a carrier signal, encoding, using an encoder, the carrier signal, and dynamically controlling a bandwidth of the carrier signal by changing a symbol rate of the carrier signal such that a data rate of the carrier signal remains substantially equal to a predetermined data rate when the carrier signal is transmitted to a remote receiver.

Particular implementations may comprise one or more of the following features. The method may further comprise adjusting a modulation factor of the carrier signal such that the data rate of the carrier signal remains substantially equal to the predetermined data rate. The method may further comprise further comprising adjusting a coding rate of the carrier signal such that the data rate of the carrier signal remains substantially equal to the predetermined data rate. The encoding may utilize a Forward Error Correction coding format. The method may further comprise adjusting a coding rate of the carrier signal such that the data rate of the carrier signal remains substantially equal to the predetermined data rate. The method may further comprise adjusting a power level of the carrier signal such that the data rate of the carrier signal remains substantially equal to the predetermined data rate. The symbol rate and modulation factor of the carrier signal may be adjusted simultaneously to maintain the data rate of the carrier signal at a level that is substantially equal to the predetermined data rate. The symbol rate and coding rate of the carrier signal may be adjusted simultaneously to maintain the data rate of the carrier signal at a level that is substantially equal to the predetermined data rate. The coding rate may be adjusted simultaneously with the simultaneous adjustment of the symbol rate and modulation factor. The method may further comprise simultaneously adjusting the power level of the carrier signal. The method may further comprise predicting a level of compensation of at least one of a coding rate, a modulation factor, a symbol rate, and a power level of the carrier signal necessary to maintain the predetermined data rate by establishing a trajectory of degradation based on feedback from the remote receiver. The trajectory of the degradation may be based on a location of the remote in a predetermined rain zone.

Implementations of a method of maintaining a data rate of each of multiple carrier signals within a telecommunications link may comprise modulating, using a modulator, a plurality of carrier signals, encoding, using an encoder, the plurality of carrier signals, and dynamically controlling a bandwidth of each of the carrier signals among the plurality of carrier signals by changing a symbol rate of one or more carrier signals such that a data rate of the one or more carrier signals remains substantially equal to a predetermined data rate when the one or more carrier signals is transmitted to a remote receiver.

Particular implementations may comprise one or more of the following features. The method may further comprise adjusting a modulation factor of one or more carrier signals among the plurality of carrier signals such that the data rate of the one or more carrier signals remains substantially equal to the predetermined data rate. The method may further comprise adjusting a coding rate of one or more carrier signals among the plurality of carrier signals such that the data rate of the one or more carrier signals remains substantially equal to the predetermined data rate. The encoding may utilize a Forward Error Correction coding format. The method may further comprise adjusting a coding rate of one or more carrier signals among the plurality of carrier signals such that the data rate of the one or more carrier signals remains substantially equal to the predetermined data rate. The method may further comprise adjusting a power level of the one or more carrier signals among the plurality of carrier signals such that the data rate of the one or more carrier signals remains substantially equal to the predetermined data rate. Unused bandwidth may remain among the plurality of carrier signals. All available bandwidth among the plurality of carrier signals may be utilized such that at least a portion of available power is unused. The symbol rate and modulation factor of the one or more carrier signals may be adjusted simultaneously to maintain the data rate of the one or more carrier signals at a level that is substantially equal to the predetermined data rate. The symbol rate and coding rate of the one or more carrier signals may be adjusted simultaneously to maintain the data rate of the one or more carrier signals at a level that is substantially equal to the predetermined data rate. The coding rate of the one or more carrier signals may be adjusted simultaneously with the simultaneous adjustment of the symbol rate and modulation factor of the one or more carrier signals. The method may further comprise simultaneously adjusting the power level of the one or more carrier signals. Unused bandwidth may remain among the plurality of carrier signals. All available bandwidth among the plurality of carrier signals may be utilized such that at least a portion of available power is unused. The method may further comprise predicting a level of compensation of at least one of a coding rate, a modulation factor, a symbol rate, and a power level of the carrier signal necessary to maintain the predetermined data rate by establishing a trajectory of degradation based on feedback from the remote receiver. The trajectory of the degradation may be based on a location of the remote in a predetermined rain zone.

Implementations of a system for maintaining a data rate of a telecommunications link may comprise a modulator configured to modulate a carrier signal, an encoder configured to encode the carrier signal, and a bandwidth controller configured to dynamically control a bandwidth of the carrier signal by changing a symbol rate of the carrier signal such that a data rate of the carrier signal remains substantially equal to a predetermined data rate when the carrier signal is transmitted to a remote receiver.

Particular implementations may comprise one or more of the following features. The system may further comprise a processor configured to adjust a modulation factor of the carrier signal such that the data rate of the carrier signal remains substantially equal to the predetermined data rate. The system may further comprise a processor configured to adjust a coding rate of the carrier signal such that the data rate of the carrier signal remains substantially equal to the predetermined data rate. The encoder may be further configured to utilize a Forward Error Correction coding format. The processor may be further configured to adjust a coding rate of the carrier signal such that the data rate of the carrier signal remains substantially equal to the predetermined data rate. The processor may be further configured to adjust a power level of the carrier signal such that the data rate of the carrier signal remains substantially equal to the predetermined data rate. The processor may be further configured to adjust the symbol rate and modulation factor of the carrier signal simultaneously to maintain the data rate of the carrier signal at a level that is substantially equal to the predetermined data rate. The processor may be further configured to adjust the symbol rate and coding rate of the carrier signal simultaneously to maintain the data rate of the carrier signal at a level that is substantially equal to the predetermined data rate. The processor may be further configured to adjust the coding rate simultaneously with the simultaneous adjustment of the symbol rate and modulation factor. The processor may be further configured to adjust simultaneously adjust the power level of the carrier signal. The system may further comprise a processor configured to predict a level of compensation of at least one of a coding rate, a modulation factor, a symbol rate, and a power level of the carrier signal necessary to maintain the predetermined data rate by establishing a trajectory of degradation based on feedback from the remote receiver. The trajectory of the degradation may be based on a location of the remote in a predetermined rain zone.

Implementations of a system for maintaining a data rate of each of multiple carrier signals within a telecommunications link may comprise a modulator configured to modulate a plurality of carrier signals, an encoder configured to encode the plurality of carrier signals, and a bandwidth controller configured to dynamically control a bandwidth of each of the carrier signals among the plurality of carrier signals by changing a symbol rate of one or more carrier signals such that a data rate of the one or more carrier signals remains substantially equal to a predetermined data rate when the one or more carrier signals is transmitted to a remote receiver.

Particular implementations may comprise one or more of the following features. The system may further comprise a processor configured to adjust a modulation factor of one or more carrier signals among the plurality of carrier signals such that the data rate of the one or more carrier signals remains substantially equal to the predetermined data rate. The processor may be further configured to adjust a coding rate of one or more carrier signals among the plurality of carrier signals such that the data rate of the one or more carrier signals remains substantially equal to the predetermined data rate. The encoder may be further configured to utilize a Forward Error Correction coding format. The processor may be further configured to adjust a coding rate of one or more carrier signals among the plurality of carrier signals such that the data rate of the one or more carrier signals remains substantially equal to the predetermined data rate. The processor may be further configured to adjust a power level of the one or more carrier signals among the plurality of carrier signals such that the data rate of the one or more carrier signals remains substantially equal to the predetermined data rate. The unused bandwidth may remain among the plurality of carrier signals. All available bandwidth among the plurality of carrier signals may be utilized such that at least a portion of available power is unused. The processor may be further configured to adjust the symbol rate and modulation factor of the one or more carrier signals simultaneously to maintain the data rate of the one or more carrier signals at a level that is substantially equal to the predetermined data rate. The processor may be further configured to adjust the symbol rate and coding rate of the one or more carrier signals simultaneously to maintain the data rate of the one or more carrier signals at a level that is substantially equal to the predetermined data rate. The processor may be further configured to adjust the coding rate of the one or more carrier signals simultaneously with the simultaneous adjustment of the symbol rate and modulation factor of the one or more carrier signals. The processor may be further configured to simultaneously adjust the power level of the one or more carrier signals. The unused bandwidth may remain among the plurality of carrier signals. All available bandwidth among the plurality of carrier signals may be utilized such that at least a portion of available power is unused. The system may further comprise a processor configured to predict a level of compensation of at least one of a coding rate, a modulation factor, a symbol rate, and a power level of the carrier signal necessary to maintain the predetermined data rate by establishing a trajectory of degradation based on feedback from the remote receiver. The trajectory of the degradation may be based on a location of the remote in a predetermined rain zone.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶6. Thus, the use of the words "function," "means" or "step" in the Description, Drawings, or Claims is not intended to somehow indicate a desire to invoke the special provisions of 35 U.S.C. §112, ¶6, to define the invention. To the contrary, if the provisions of 35 U.S.C. §112, ¶6 are sought to be invoked to define the claimed disclosure, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶6. Moreover, even if the provisions of 35 U.S.C. §112, ¶6 are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, frequency examples, or methods disclosed herein. Many additional components and assembly procedures known in the art consistent with a method and system for optimizing data throughput for dynamic link conditions using adaptive coding and modulation (ACM) and dynamic single channel per carrier (dSCPC) techniques are in use with particular implementations from this disclosure. Accordingly, for example, although particular implementations are disclosed, such implementations and implementing components may comprise any components, models, versions, quantities, and/or the like as are known in the art for such systems and implementing components, consistent with the intended operation.

This disclosure relates to, but is not limited to a method and system for optimizing data throughput for dynamic link conditions using adaptive coding and modulation (ACM) and dynamic single channel per carrier (dSCPC) techniques. The combination of ACM and dSCPC provides a novel approach to controlling the allocation of bandwidth over a dynamic link. This allows for optimal throughput to meet the Service Level Agreement (SLA) for the minimum-Information Rate (MinIR), Committed Information Rate (CIR) and Maximum Information Rate (MIR). The ability to provide control over the link to assign the modulation format, FEC coding format, amount of bandwidth (assigned symbol rate) and spacing of the carriers provides total control of the use of a pool or pools of bandwidth. Particular implementations described herein are and/or may use, but are not limited to, Field-Programmable Gate Arrays (FPGA), Programmable Logic Devices (PLD), Programmable Integrated Circuits (PIC), Digital Signal Processors (DSP), Application Specific Integrated Circuits (ASIC) or microprocessors.

Implementations of the methods and systems described provide the ability for someone skilled in the art to allocate an established SLA per site and using implementations of the methods and systems described, ensure all sites receive or apply every effort possible to meet the SLA assigned to a given site or group of sites.

As discussed above, this disclosure relates to a method and system of using a combination of ACM and dSCPC methods to dynamically adjust the modulation, Forward Error Correction (FEC), and symbol rate of one or more carrier signals via the dSCPC process to ensure that each site has been assigned the proper rate to meet the assigned SLA of the site. The SLA may be comprised of the following configuration parameters as known to one of ordinary skill in the art:

Committed Information Rate (CIR) is the rate that is determined to be provided to the user even in degraded conditions. This rate is the nominal rate that one would expect to receive for +99.95% of a given year. +99.95% is shown for illustrative purposes, but the network availability is typically represented into the $98^{th}$ to $99^{th}$ percentile for a network. For the example given above, 99.95% equates to 99.95%*(8,736 hours per year)=8,731.632 hours that the network is meeting the desired CIR, and no more than 4.368 hours per year the network is operating below the desired CIR.

Minimum Information Rate (MinIR) is the rate that is deemed minimally acceptable for some level of operation. The MinIR is deemed as the link degraded minimum rate that one can expect to achieve based on the "anticipated" worst case link conditions, and would be the conditions that would be outside (below) the CIR. Degraded conditions would be calculated as 100% availability less the CIR Operational time (99.95%)=0.05% for the example shown above. As stated in the definition of the CIR the MinIR results in 0.05%*8,736 hours per year=4.368 hours per year where the link is operating in the MinIR.

Maximum Information Rate (MIR): This is the rate that is determined to be provided to the user when link conditions are deemed to be "clear sky." In this condition, there is additional bandwidth in the pool that may be distributed above and beyond the allocated CIR for all other sites in the network. This rate is the nominal rate plus any additional or unallocated bandwidth that one would expect to receive for operation in clear sky conditions. The ability to determine the amount of MIR is difficult, since one does not have control of the link conditions, e.g. only when link conditions are optimal, may the MIR bandwidth be utilized.

Networks can be configured to operate as Continuous Coding and Modulation (CCM), in which the symbol rate is fixed and FEC coding and modulation (MODCOD) is also fixed. In this configuration, the configuration must be established to operate in the worst case link conditions all the time resulting in a less than optimal use of bandwidth. Variable Coding and Modulation (VCM) provides a fixed or a priori configuration of a fixed symbol rate and limited number of FEC coding and modulation formats that are supported. Sites are statically assigned to a given MODCOD in the VCM configuration. Adaptive Coding and Modulation (ACM) provides a fixed symbol rate and dynamic FEC coding and modulation formats. In all formats (CCM, VCM, and ACM), the symbol rate is fixed. However, systems that dynamically allocate bandwidth are not novel in and of themselves. It is the combination of continuous link monitoring and the use of ACM coupled with dSCPC to optimally assign bandwidth from a pool of bandwidth in accordance with the methods and systems described herein that are considered novel.

Particular implementations of a method and system for optimizing data throughput for dynamic link conditions using adaptive coding and modulation (ACM) and dynamic single channel per carrier (dSCPC) techniques disclosed herein may be specifically employed in satellite communications systems. However, as will be clear to those of ordinary skill in the art from this disclosure, the principles and aspects disclosed herein may readily be applied to any electromagnetic (IF, RF and optical) communications system, such as a terrestrial broadcast network without undue experimentation.

Figure 1:
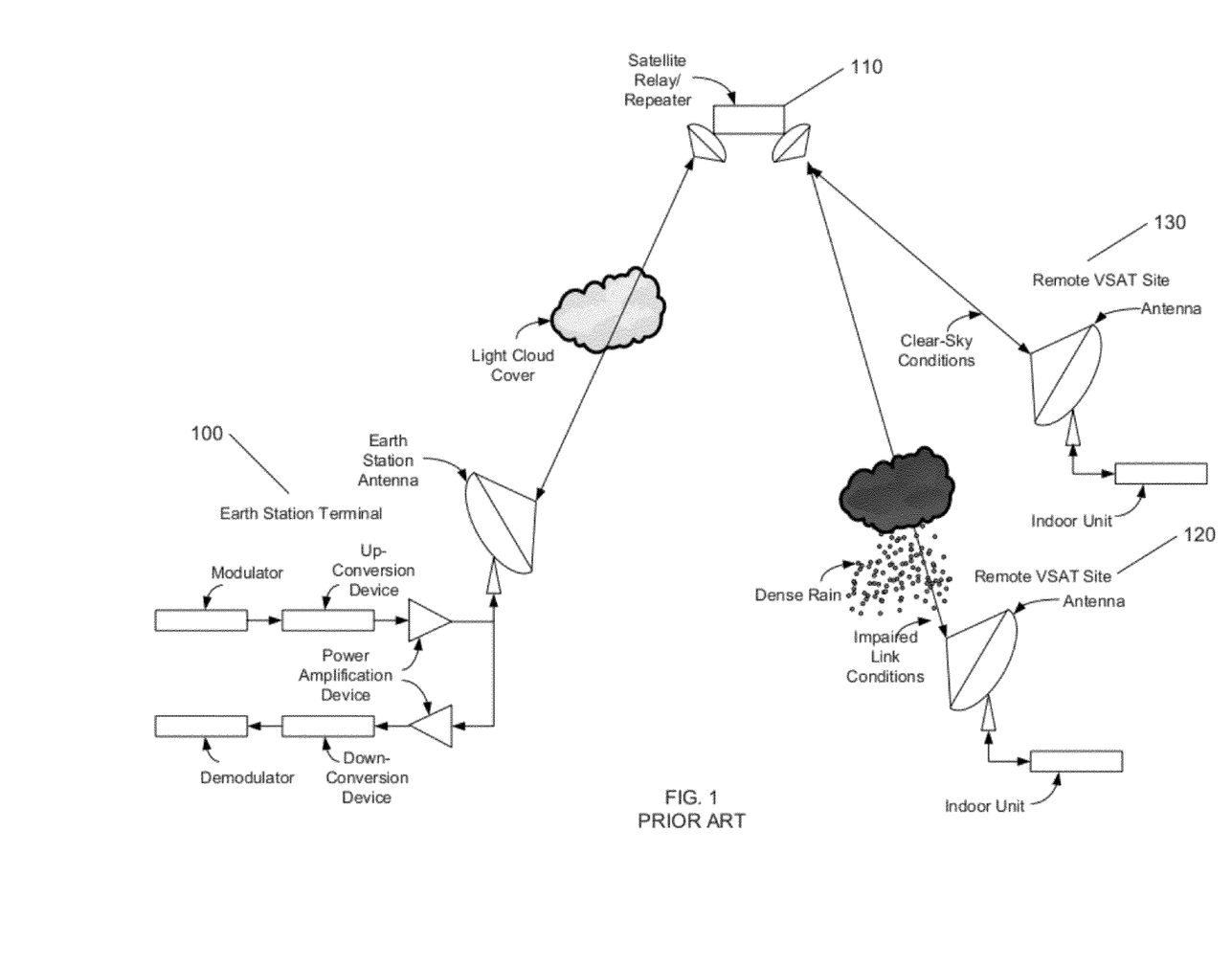
FIG. 1 is a representation of an example of a geographically diverse satellite network with an earth station terminal communicating with two remote sites wherein all sites are experiencing different link conditions.

FIG. 1 shows a typical satellite configuration where three sites, an earth station terminal 100 (hub) is communicating over a satellite repeating relay 110 to two geographically diverse remote sites 120, 130. As is shown, between the three sites, all three sites are experiencing different link conditions. The hub 100 is experiencing only light cloud cover with minimal or no link attenuation. One remote site 130 is running in clear-sky conditions with no link degradation, and the second remote site 120 is running in an impaired link condition with heavy rain falling over the site.

Figure 2:
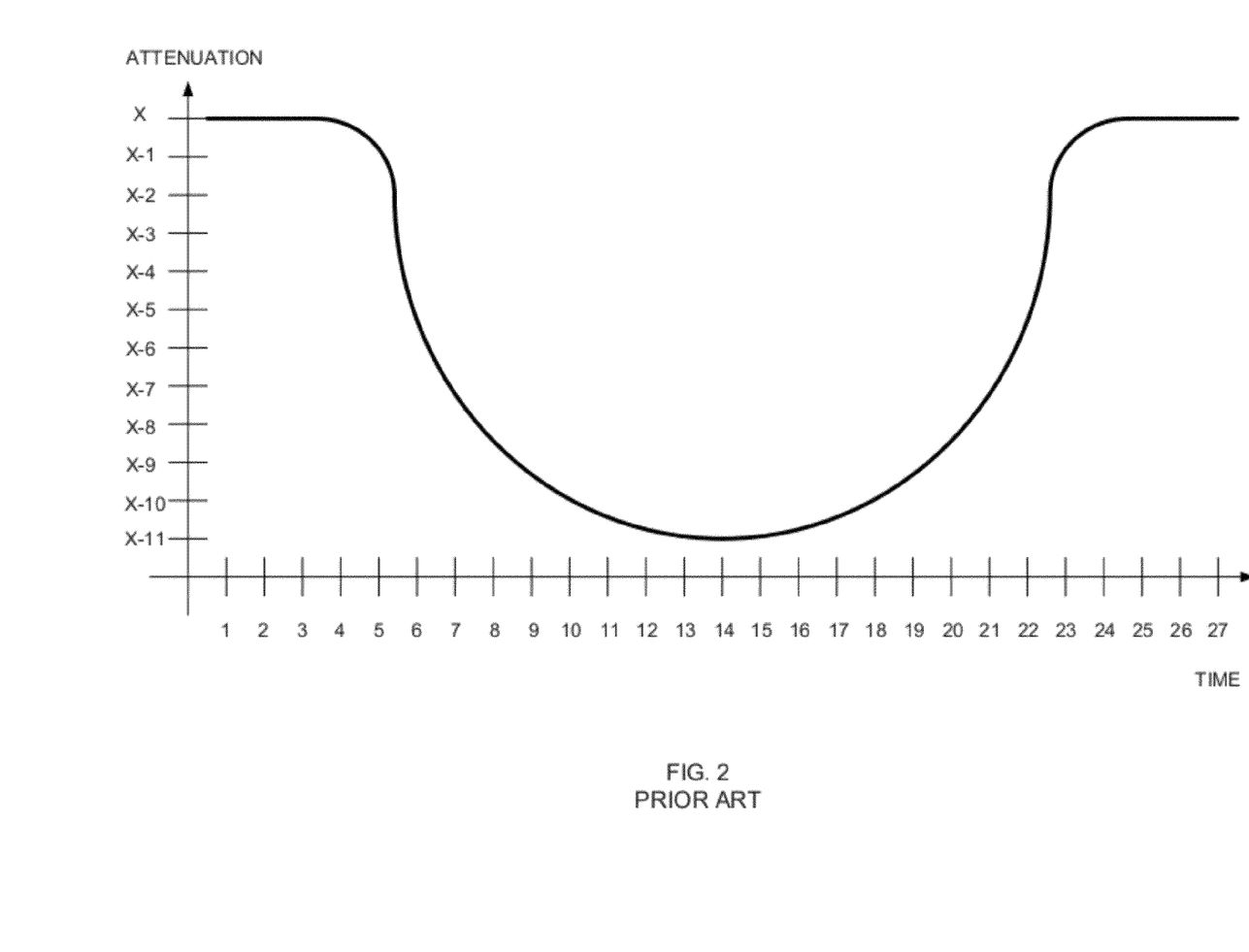
FIG. 2 is a graph of attenuation of time of an exemplary link beginning in a clear-sky condition then moving to a degraded state and returning to a clear-sky condition.

FIG. 2 demonstrates that the link conditions are not a constant for a wireless electromagnetic (EM) medium. In satellite communications, one of the most influential parameters that affect the link quality is the density of rain or moisture in the atmosphere in the path to or from the satellite. For lower band communications such as Very-High Frequency (VHF), Ultra-High Frequency (UHF), L-, S-, C- or X-band, moisture has minimal impact to the signal. In low-band communications, the ACM capabilities of the method may run at or near the clear-sky condition most of the time. The power of the method is not realized until the frequencies are higher, e.g. Ku-Band, Ka-Band or V-Band and higher where rain and atmospheric moisture causes significant attenuation to the link that the power of the method can be realized.

Figure 3A:
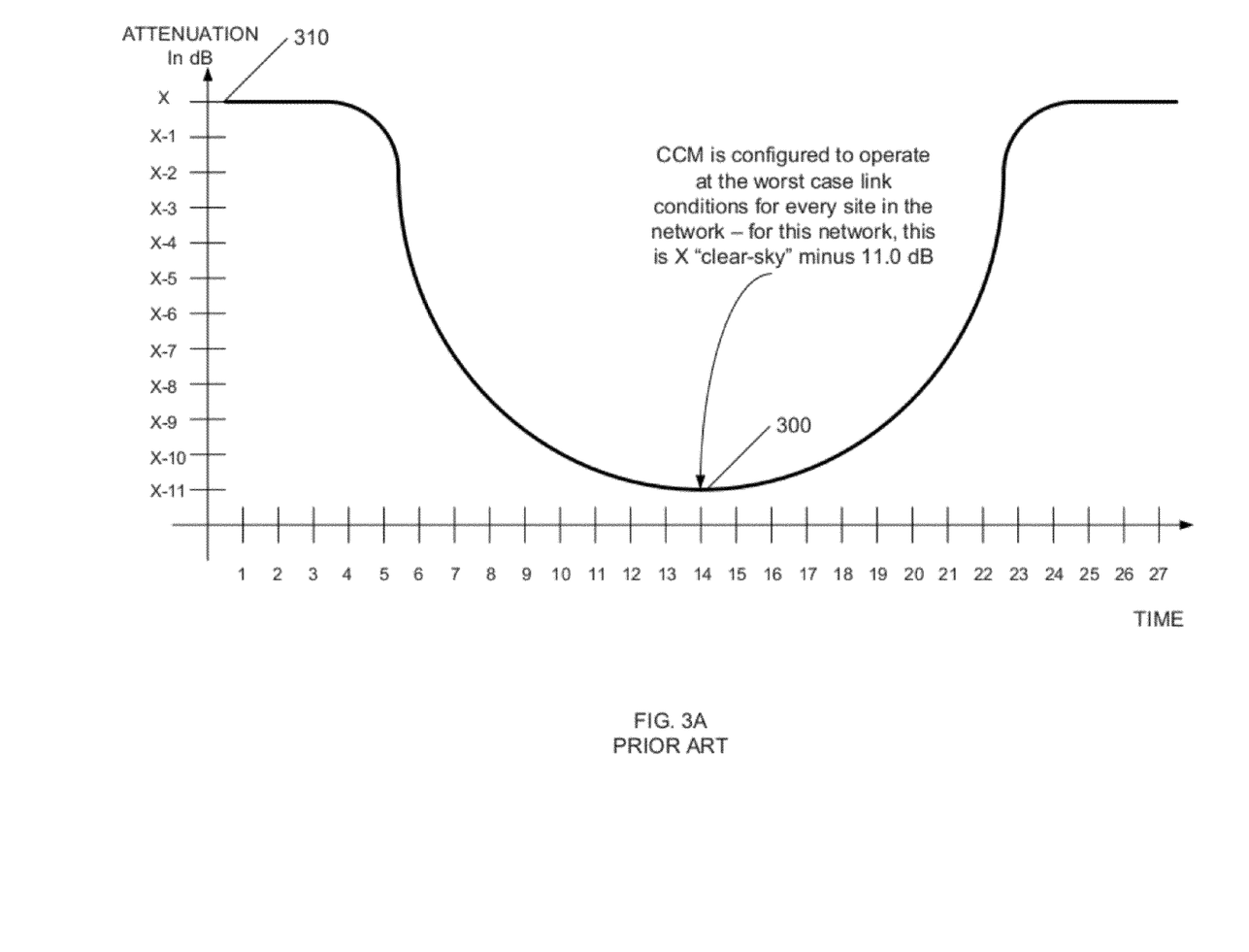
FIG. 3A is a graphical representation of the prior art with a worst case fading condition of a link based on a worst case that a CCM network has been designed to support.

FIG. 2 illustrates, in graphical form, the results of a link degradation and recovery for a Ku-Band signal over the course of 27 seconds. For bands higher than Ku-Band (11 GHz) the effects of atmospheric moisture or rain becomes a significant issue. At Ku-Band, as the density of rain increases, the attenuation of a signal increases due to absorption of the signal by the rain droplets. In the prior art, as shown in FIG. 3A, in a network that does not support any dynamic control of the modulation, coding or power, the site must be configured to accommodate for the worst case amount of fading. FIG. 3A demonstrates that the maximum fading 300 is −11 dB from the attenuation at clear-sky operating conditions 310 represented as X. Continuous Coding and Modulation (CCM), as shown in FIG. 3A, was the traditional method for supporting networks until the introduction of techniques such as DVB-S2 which supports VCM and ACM. The result of configuring a site for the worst case fading is that bandwidth and power are wasted during periods of operation that is not in the worst case fading condition.

Figure 3B:
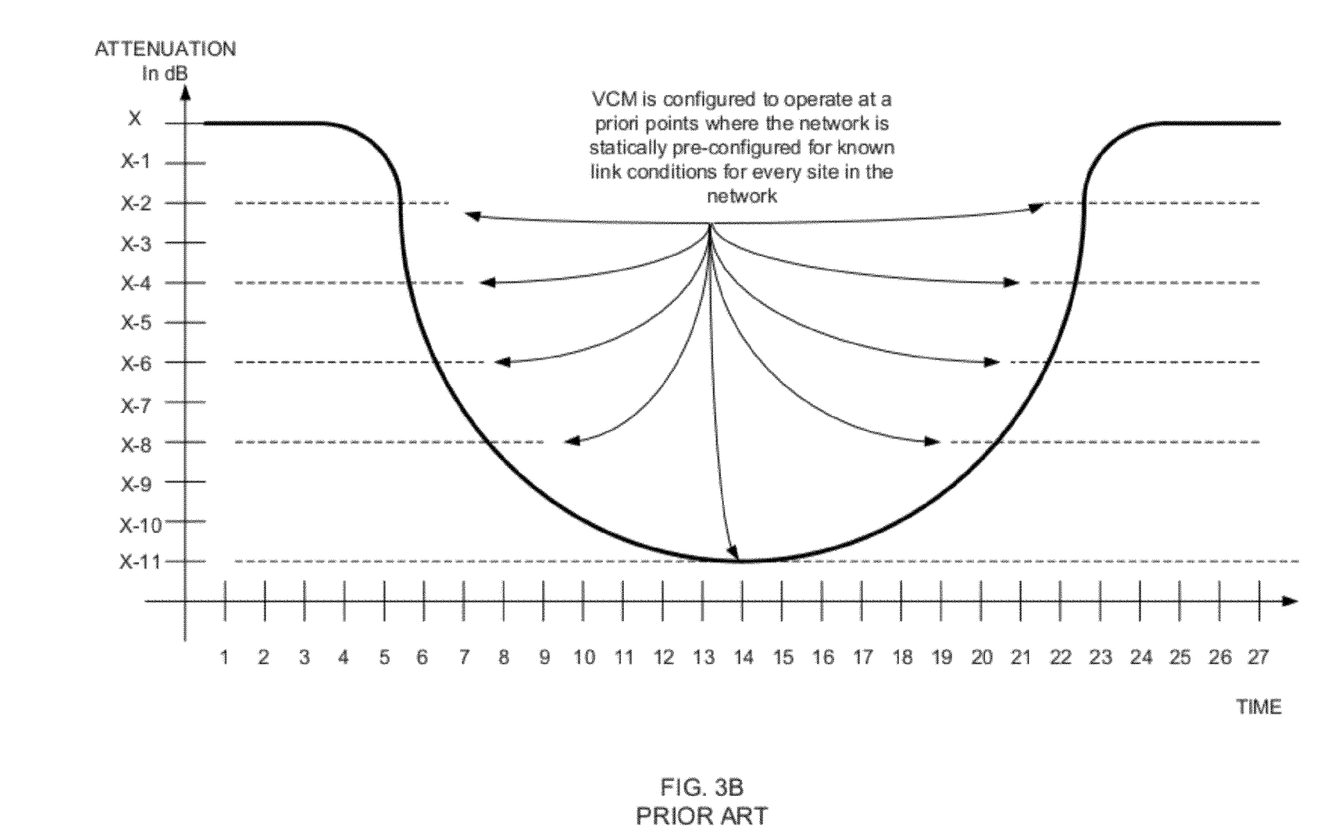
FIG. 3B is a graphical representation of the prior art with levels of fading and a worst case fading condition of a link depicting levels of fading that a VCM network has been designed to support at various levels of modulation and FEC coding combinations.

As prior art shown in FIG. 3B, with the introduction of DVB-S2, Variable Coding and Modulation (VCM) was introduced as a mechanism that uses a constant symbol rate but allows several levels of the modulation and coding to be configured to account for sites that may have more tolerance to fading or may have a lower contractual SLA and can tolerate the longer outages due to the fading conditions. The number of available MODCODs that are typically available for use are a relatively small number such as four or five levels of operation at best.

Figure 3C:
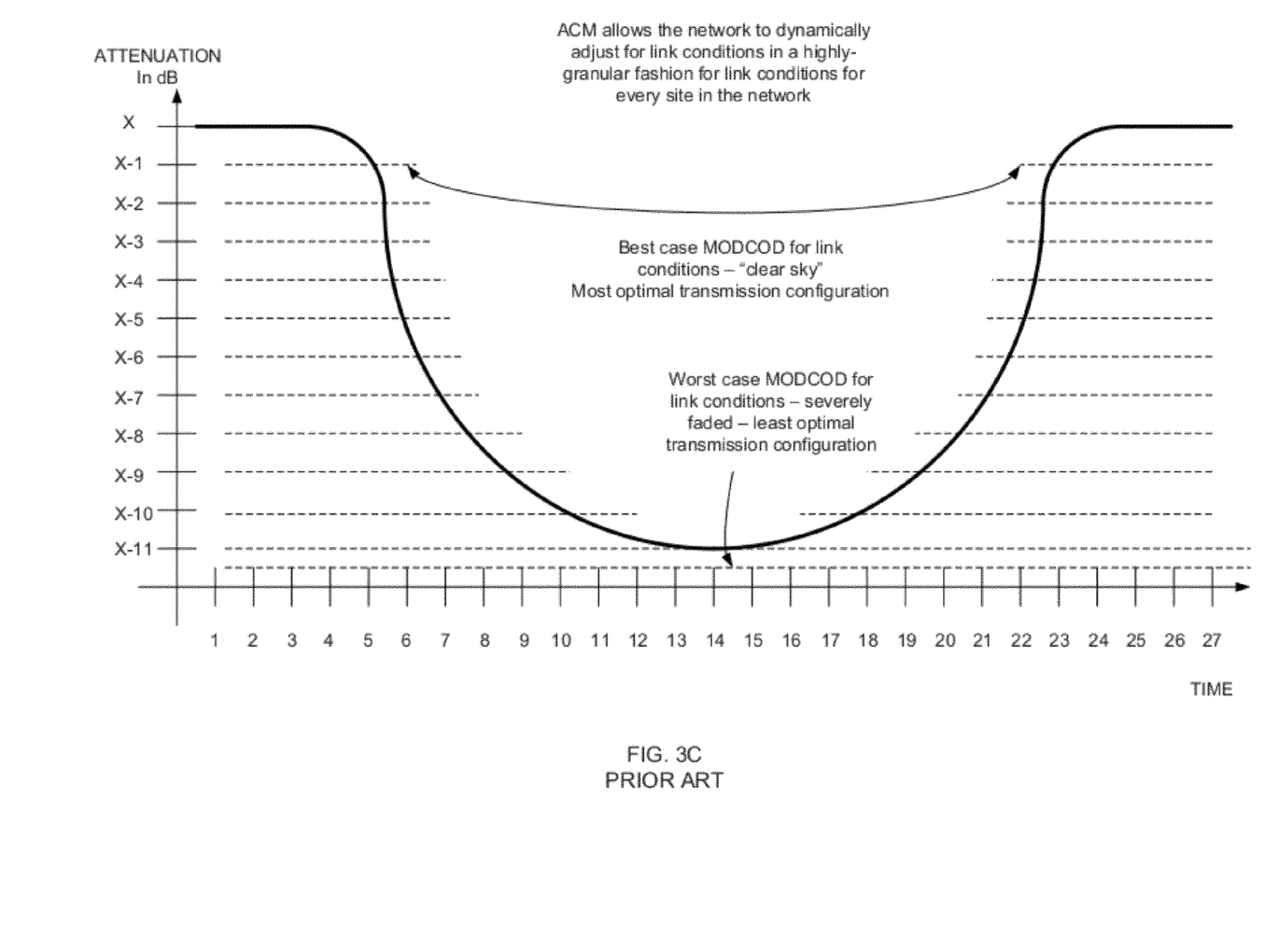
FIG. 3C is a graphical representation of the prior art with levels of fading, a worst case fading condition of a link, and a level of margin below the worst case configuration depicting levels of fading that an ACM network has been designed to support at various levels of modulation and FEC coding combinations.

As prior art shown in FIG. 3C, with the introduction of DVB-S2, Adaptive Coding and Modulation (ACM) was introduced as a mechanism that uses a constant symbol rate, but allows several levels of the modulation and coding to be configured and used for sites as link conditions change. With ACM, the remote sites report the quality of the received signal as symbol energy over noise density (Es/No) or bit energy over noise density (Eb/No) as a representation of link quality for the ACM controller to determine the appropriate MODCOD that should be used to send information to the receiving device. Additionally, in some configurations, the receiving device may suggest to the sending device, which MODCOD may be best for transmitting information to the receiving device. A subset of the entire available MODCODs are typically kept to a limited number for optimal operation on a shared link. However, for some implementations of the described methods, the number of available MODCODs is not limited since the dSCPC channel does not need to be shared, so the inefficiencies associated with a shared medium are thus removed.

Figure 4:
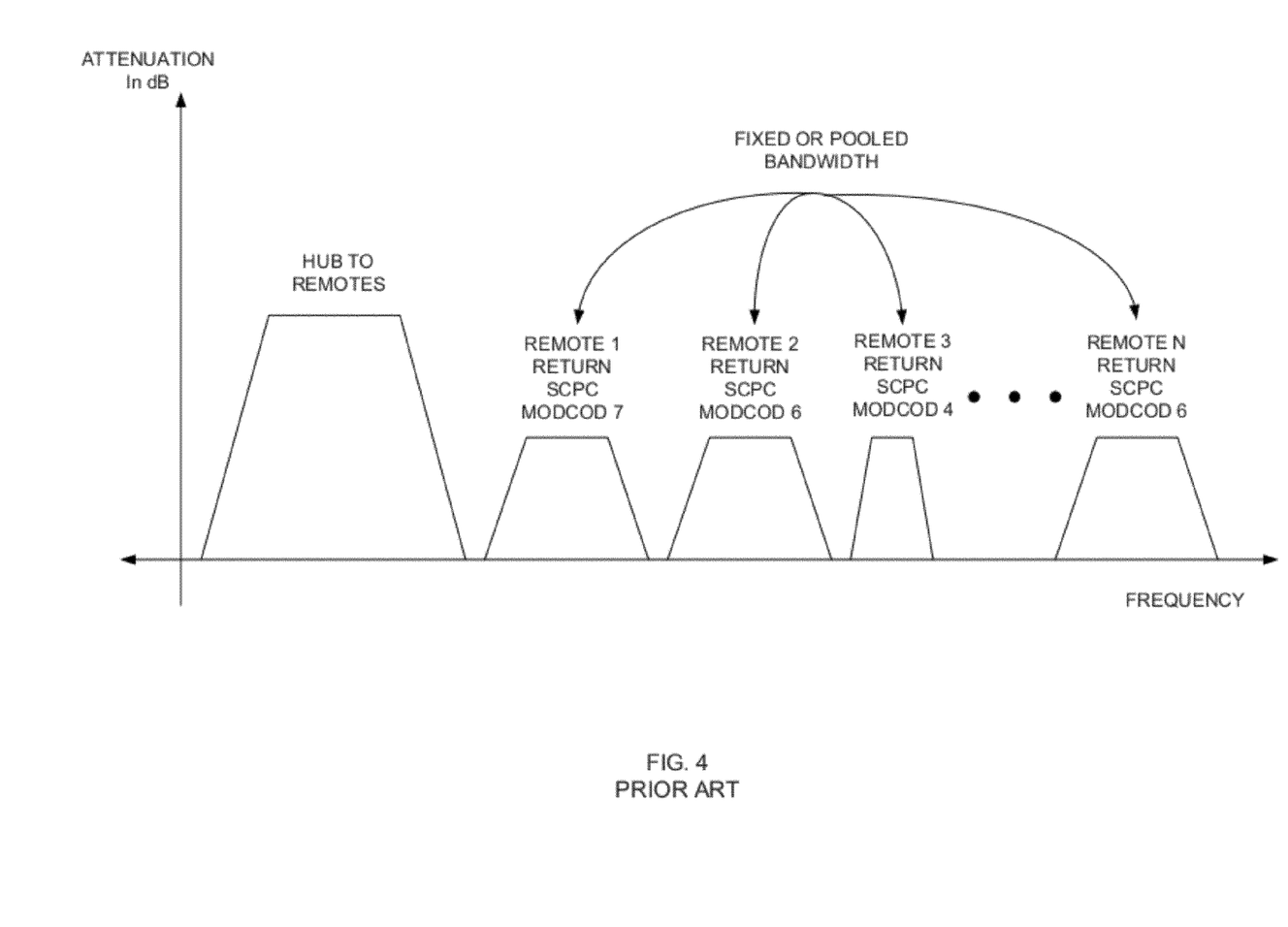
FIG. 4 is a graphical representation of the prior art showing an SCPC network with a hub earth station transmitting a common outbound carrier signal to many remote terminals having a continuous single channel per carrier (SCPC) return channel.

FIG. 4 shows a prior art graph of attenuation versus signal frequency for a common outbound (hub earth station) communicating with many remote locations wherein each return channel is a dedicated single channel per carrier (SCPC) return channel operating within a fixed or pooled bandwidth. The ability to provide a dynamic SCPC return channel is also prior art.

Figure 5:
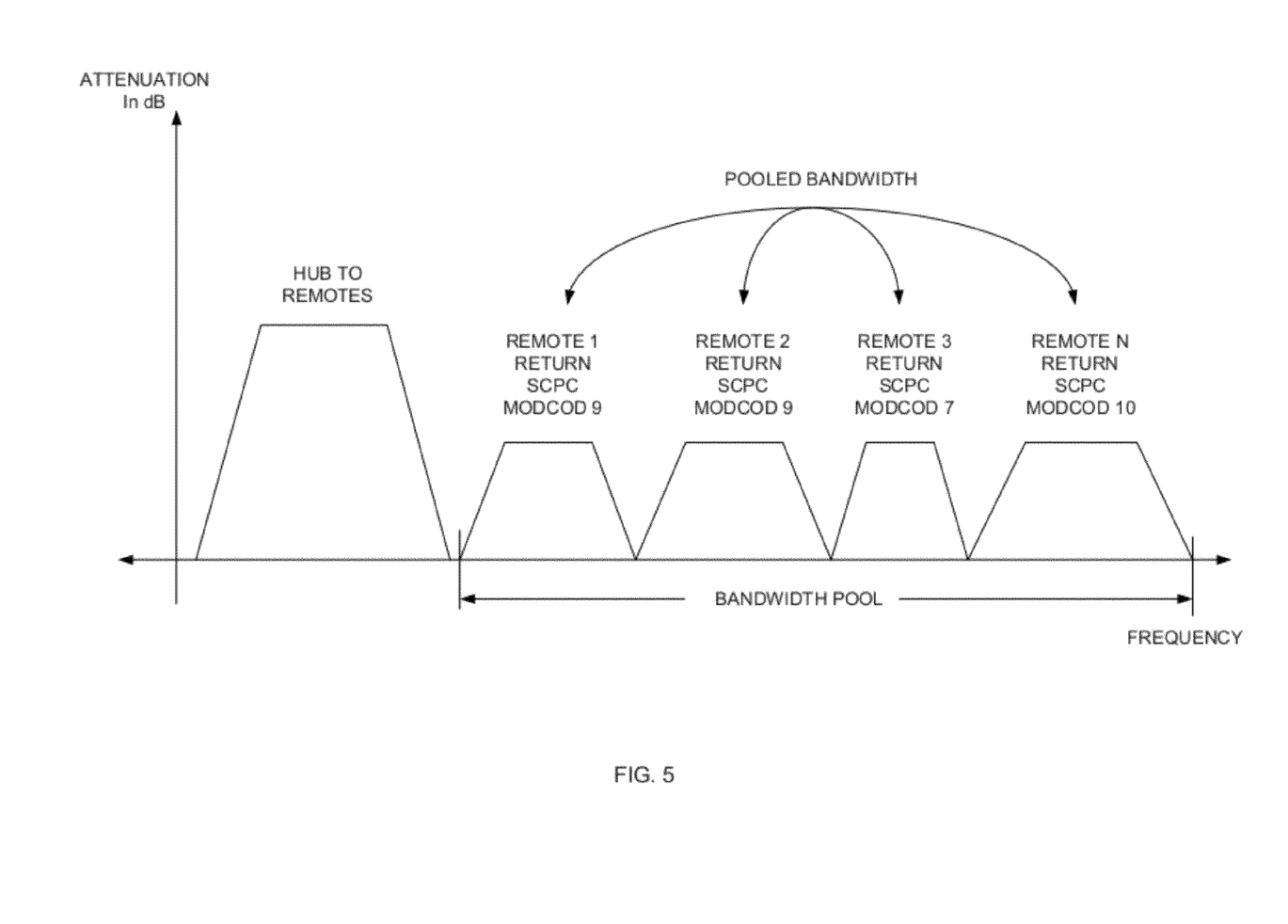
FIG. 5 is a representation of an implementation of a method of controlling a spacing of carrier signals to optimize bandwidth usage for an ACM and dSCPC network having a common outbound carrier signal transmitted from a hub earth station to a plurality of remotes dynamic return channel terminals.

FIG. 5 shows a graph of attenuation versus signal frequency for an implementation of the described system where a common hub (earth station) provides a common carrier signal to the remotes. In the art, this is known as the forward path or outbound. Each remote's access to the hub is controlled by a process at the hub for the assignment of return channel bandwidth. The assignment of bandwidth may include, but is not limited to the center frequency (and resulting carrier signal separation), symbol rate, modulation, and FEC coding format. Comparing FIG. 4 to FIG. 5, the difference illustrates that the bandwidth pool is completely occupied, e.g. no unused bandwidth is shown, in FIG. 5 when an implementation of the described system and method are utilized. Additionally, the carrier signal width of remotes 1-N are wider. This provides more bandwidth for a higher return bit-per-second rate that may be realized as Maximum Input Rate (MIR), the carrier signals are spaced more closely together, and the MODCODs are higher. The net results is providing higher throughput to each remote VSAT terminal.

The concept of Committed Information Rate (CIR) refers to the state in which the hub bandwidth process provides the assigned bandwidth to each remote in a manner that firstly ensures each remote has met the established CIR in the SLA. In this baseline state, the bandwidth is allocated in a manner that sets the symbol rate (dSCPC), MODCOD (ACM) and carrier signal spacing to ensure the received Es/No is within the capabilities of the link conditions and equipment (antenna size, Gain/Temperature (G/T) of the satellite, transmit amplifier, etc.) and that the link can be closed, resulting in end-to-end transmission from the remote VSAT site to the hub. Typically, the baseline state is established in which the link conditions and site configuration can meet the CIR based on a mid-range point between a range of MODCOD. As link conditions become optimal (clear-sky), the MODCOD may be increased to a value that provides better bps/Hz, thereby resulting in MIR bandwidth. This provides a lower range than when link conditions degrade to the mid-range at which the CIR is met and a worst case configuration in which the link has degraded to a point where the link can marginally be closed thereby resulting in a MinIR that may be available.

Another novelty of some implementations of the described methods is that the symbol rate and ACM MODCOD may decrease to a level significantly below the CIR and become the MinIR. In the MinIR, communications from the site may be possible but will therefore be at an extremely low level.

Figure 6:
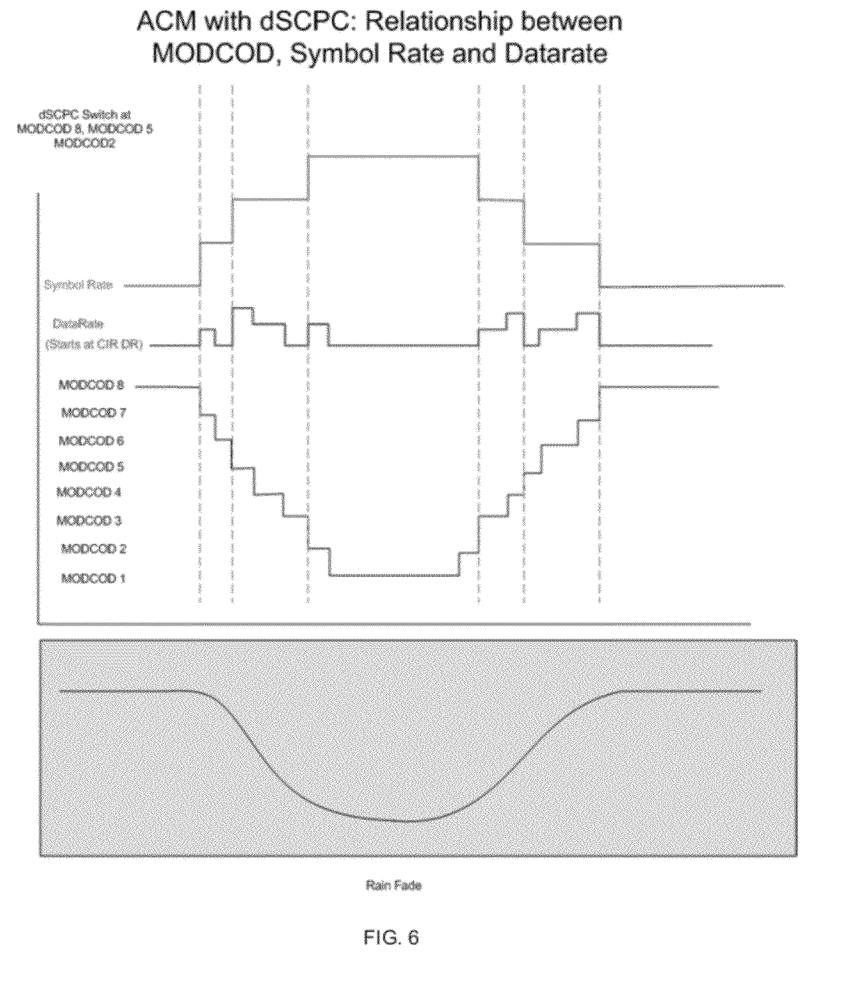
FIG. 6 is a graphical illustration of a dynamic nature of the symbol rate (dSCPC) resulting in a dynamic data rate and the associated modulation and FEC coding rate changing to meet the dynamic link conditions.

FIG. 6 is an illustration of dynamic nature of the symbol rate (dSCPC) resulting in a dynamic data rate and the associated modulation and FEC coding rate changing to meet the dynamic link conditions.

Implementations of the described methods manage the configuration of the carrier signals such that all aspects of the carrier signals are known by the bandwidth manager process so that changes, however minute, are known by the bandwidth manager process, so that if a site is starting to experience a change in the link conditions, a trajectory may be established based on the received data from the site(s) under management. A trajectory is known in the art as a change in the link conditions over a given time. FIG. 6 provides a graphical illustration of the dynamic nature of the symbol rate (dSCPC) resulting in a dynamic data rate and the associated modulation and FEC coding rate changing to meet the dynamic link conditions and is shown in relation to a related rain fade curve. While the change in the link conditions are not a priori, the trajectory of fading may be extrapolated in a manner that assumes that for a given rain zone, one could assume that the rain could go from current conditions to as bad as is defined in the rain zone. For example, if a site in a desert is starting to experience a degraded link condition, and the site's rain zone is known, samples may be taken over time and a trajectory established to estimate what the next change in degradation could be and a weighting could be applied based on the established rain zone. The level of degradation of a site located in an arid part of the United States may not have as steep of a trajectory or depth of degradation as one located in the southeastern United States may experience. As a second example, if a site that is located in the southeastern United States is starting to experience a degraded link condition and the site's rain zone is known, samples may be taken over time and a trajectory established to estimate what the next change in degradation may be and a weighting may be applied based on the established rain zone. In the southeastern United States, the depth of fade may be significantly deeper than an arid area, and thus, may have a steeper trajectory and deep depth of link degradation. Even with minimal feedback from the site, the model may predict where the fading may go to before the next sample is taken.

Figure 7:
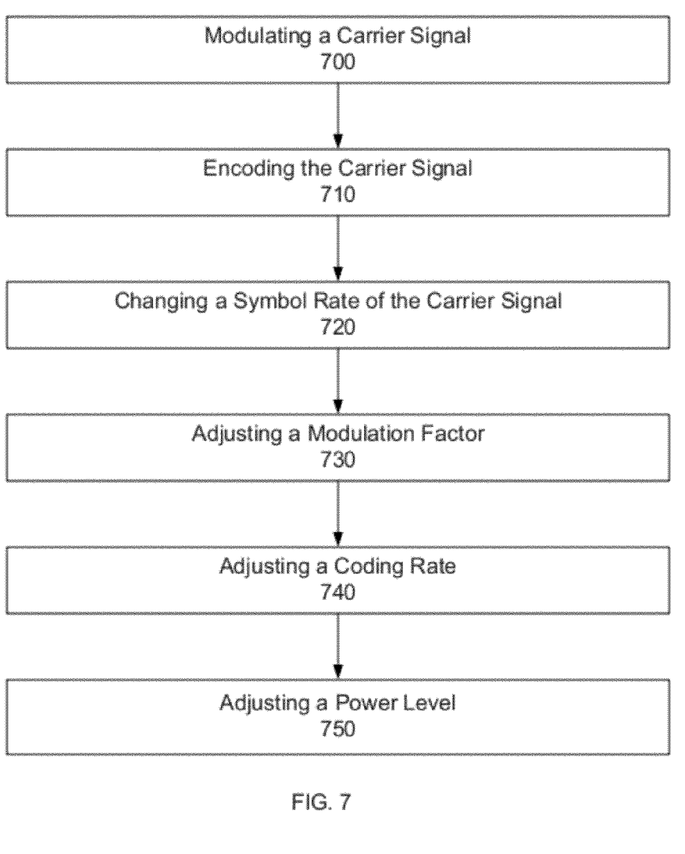
FIG. 7 is a block diagram of an implementation of a method of maintaining a data rate within a telecommunications link.

FIG. 7 depicts an implementation of a method of maintaining a predetermined data rate for a communications link. In addition to modulating 700 and encoding 710 the carrier signal, the bandwidth of the carrier signal is dynamically controlled by changing a symbol rate 720 of the carrier signal so that the data rate of the carrier signal remains substantially equal to the predetermined data rate when the carrier signal is transmitted to a remote receiver. Additionally, adjustments to the modulation factor 730, coding rate 740, and/or power level 750 may occur to maintain the predetermined data rate during transmission. Any of these additional adjustments may occur individually or in combination with other adjustments and may occur simultaneously or in any other temporal relation to one another. Implementations of the method may also include adjusting the symbol rate, modulation factor, coding rate, and/or power level for a plurality of signals.

The following are particular implementations of a method and system for optimizing data throughput for dynamic link conditions using adaptive coding and modulation (ACM) and dynamic single channel per carrier (dSCPC) techniques and are provided as non-limiting examples:

EXAMPLE 1

A satellite network is configured to operate as a CCM network that does not use the described methods. The Ku-Band network is comprised of 15 VSAT stations (remotes) and is configured to receive a common outbound carrier signal from a hub (earth station). The 15 remote VSATs are configured as three types (antenna, amplifier, and location of terminal in the satellite's footprint) with three types of data: type 1 uses a 1.2 m dish with an 8 Watt BUC and requires 512 Kbps of CIR throughput to support data and voice applications; type 2 uses a 1.8 m dish with an 8 Watt BUC and requires 1,332 Kbps of CIR throughput to support data and voice applications; and type 3 uses a 2.4 m dish with an 8 Watt BUC and requires 2,588 Kbps of CIR throughput to support data and voice applications. To meet the CIR with a CCM (prior art) configuration, the configuration requires 22,160 Mbps of user throughput to support the 15 sites, resulting in 20,228 KHz of Ku-Band spectrum.

EXAMPLE 2

In particular implementations of the system described in Example 1, using an implementation of the described method with ACM and dSCPC and the need to support 22,160 Mbps of user throughput to the 15 sites, the required spectrum is reduced to 11,650.8 KHz of Ku-Band spectrum. The resulting efficiency using an implementation of the described method over CCM results in an improvement in spectral efficiency of 190.2%.

EXAMPLE 3

In the particular implementation of the system described in Example 1, using an implementation of the described method with ACM and dSCPC and the need to support 22,160 Mbps of user throughput to the 15 sites, reducing the carrier signal spacing from 1.35 to 1.20 results in an improvement in spectral efficiency of 211.3% over CCM.

EXAMPLE 4

A satellite network is configured to operate as a CCM network that does not use the described methods. The C-Band network is comprised of nine VSAT stations (remotes) and is configured to receive a common outbound carrier signal from a hub (earth station). The nine remote VSATs are configured as three types (antenna, amplifier, and location of terminal in the satellite's footprint) with three types of data: type 1 uses a 1.8 m dish with an 8 Watt BUC and requires 512 Kbps of CIR throughput to support data and voice applications; type 2 uses a 2.4 m dish with an 8 Watt BUC and requires 1,332 Kbps of CIR throughput to support data and voice applications; and type 3 uses a 3.7 m dish with an 8 Watt BUC and requires 2,588 Kbps of CIR throughput to support data and voice applications. To meet the CIR with a CCM (prior art) configuration, the configuration requires 13,296 Mbps of user throughput to support the 9 sites, resulting in 13.296 KHz of Ku-Band spectrum.

EXAMPLE 5

In particular implementations of the system described in Example 4, using an implementation of the described method with ACM and dSCPC and the need to support 13,296 Mbps of user throughput to the nine sites, the required spectrum is reduced to 5,413.9 KHz of C-Band spectrum. The resulting efficiency using an implementation of the described method over CCM results in an improvement in spectral efficiency of 245.6%.

EXAMPLE 6

In the particular implementation of the system described in Example 4, using an implementation of the described method with ACM and dSCPC and the need to support 13,296.0 Mbps of user throughput to the nine sites, and reducing the carrier signal spacing from 1.35 to 1.20, the improvement in spectral efficiency over CCM is increased to 272.9%.

EXAMPLE 7

A satellite network is configured to operate using an implementation of the described method. The Ku-Band network is comprised of 15 VSAT stations (remotes) and is configured to receive a common outbound carrier signal from a hub (earth station). The 15 remote VSATs are configured as three types (antenna, amplifier, and location of terminal in the satellite's footprint) with three types of data: type 1 uses a 1.2 m dish with an 8 Watt BUC and requires 512 Kbps of CIR throughput to support data and voice applications; type 2 uses a 1.8 m dish with an 8 Watt BUC and requires 1,332 Kbps of CIR throughput to support data and voice applications; and type 3 uses a 2.4 m dish with an 8 Watt BUC and requires 2,588 Kbps of CIR throughput to support data and voice applications. One site experiences severe rain fade, resulting in the site not being able to meet the CIR. Using an implementation of the described method, the MODCOD may be lowered to the lowest MODCOD and communications restored.

In places where the description above refers to particular implementations of telecommunication systems and techniques for transmitting data across a telecommunication channel, it should be readily apparent that a number of modifications may be made without departing from the spirit thereof and that these implementations may be applied to other to telecommunication systems and techniques for transmitting data across a telecommunication channel.

The invention claimed is:

1. A method of maintaining a data rate of a telecommunications link, the method comprising:
    modulating, using a modulator, a carrier signal comprising a single data stream;
    encoding, using an encoder, the carrier signal;
    dynamically controlling a bandwidth of the carrier signal by changing a symbol rate of the carrier signal such that a data rate of the carrier signal remains substantially equal to a predetermined data rate when the carrier signal is transmitted to a remote receiver; and
    predicting a level of compensation of at least one of a coding rate, a modulation factor, the symbol rate, and a power level of the carrier signal necessary to maintain the predetermined data rate by establishing a trajectory of degradation based on feedback from the remote receiver.

2. The method of claim 1, wherein the trajectory of the degradation is based on a location of the remote in a predetermined rain zone.

3. The method of claim 1, further comprising adjusting the modulation factor of the carrier signal such that the data rate of the carrier signal remains substantially equal to the predetermined data rate.

4. The method of claim 3, further comprising adjusting a coding rate of the carrier signal such that the data rate of the carrier signal remains substantially equal to the predetermined data rate.

5. The method of claim 4, further comprising adjusting a power level of the carrier signal such that the data rate of the carrier signal remains substantially equal to the predetermined data rate.

6. The method of claim 1, further comprising adjusting the coding rate of the carrier signal such that the data rate of the carrier signal remains substantially equal to the predetermined data rate.

7. The method of claim 6, wherein the encoding utilizes a Forward Error Correction coding format.

8. The method of claim 6, wherein the symbol rate and coding rate of the carrier signal are adjusted simultaneously to maintain the data rate of the carrier signal at a level that is substantially equal to the predetermined data rate.

9. The method of claim 6, wherein the symbol rate and modulation factor of the carrier signal are adjusted simultaneously to maintain the data rate of the carrier signal at a level that is substantially equal to the predetermined data rate.

10. The method of claim 9, wherein the coding rate is adjusted simultaneously with the simultaneous adjustment of the symbol rate and modulation factor.

11. The method of claim 10, further comprising simultaneously adjusting the power level of the carrier signal.

12. A method of maintaining a data rate of each of multiple carrier signals within a telecommunications link, the method comprising:
   modulating, using a modulator, a plurality of carrier signals, each carrier signal comprising a single data stream corresponding to the carrier signal;
   encoding, using an encoder, the plurality of carrier signals; and
   dynamically controlling a bandwidth of each of the carrier signals among the plurality of carrier signals by changing a symbol rate and a coding rate of one or more carrier signals such that a data rate of the one or more carrier signals remains substantially equal to a predetermined data rate when the one or more carrier signals is transmitted to a remote receiver, wherein the symbol rate and the coding rate of the one or more carrier signals are adjusted simultaneously.

13. The method of claim 12, wherein the encoding utilizes a Forward Error Correction coding format.

14. The method of claim 12, further comprising adjusting a coding rate of one or more carrier signals among the plurality of carrier signals such that the data rate of the one or more carrier signals remains substantially equal to the predetermined data rate.

15. The method of claim 14, further comprising adjusting a power level of the one or more carrier signals among the plurality of carrier signals such that the data rate of the one or more carrier signals remains substantially equal to the predetermined data rate.

16. The method of claim 15, wherein unused bandwidth remains among the plurality of carrier signals.

17. The method of claim 15, wherein all available bandwidth among the plurality of carrier signals is utilized such that at least a portion of available power is unused.

18. The method of claim 12, wherein unused bandwidth remains among the plurality of carrier signals.

19. The method of claim 12, wherein all available bandwidth among the plurality of carrier signals is utilized such that at least a portion of available power is unused.

20. The method of claim 12, further comprising predicting a level of compensation of at least one of a coding rate, a modulation factor, a symbol rate, and a power level of the carrier signal necessary to maintain the predetermined data rate by establishing a trajectory of degradation based on feedback from the remote receiver.

21. The method of claim 12, wherein the trajectory of the degradation is based on a location of the remote in a predetermined rain zone.

22. The method of claim 12, further comprising adjusting the modulation factor of one or more carrier signals among the plurality of carrier signals such that the data rate of the one or more carrier signals remains substantially equal to the predetermined data rate.

23. The method of claim 12, wherein the symbol rate and the modulation factor of the one or more carrier signals are adjusted simultaneously to maintain the data rate of the one or more carrier signals at a level that is substantially equal to the predetermined data rate.

24. The method of claim 23, wherein the coding rate of the one or more carrier signals is adjusted simultaneously with the simultaneous adjustment of the symbol rate and modulation factor of the one or more carrier signals.

25. The method of claim 12, further comprising simultaneously adjusting the power level of the one or more carrier signals.

26. A system for maintaining a data rate of a telecommunications link, the system comprising:
   a modulator configured to modulate a carrier signal comprising a single data stream;
   an encoder configured to encode the carrier signal;
   a bandwidth controller configured to dynamically control a bandwidth of the carrier signal by changing a symbol rate and a coding rate of the carrier signal such that a data rate of the carrier signal remains substantially equal to a predetermined data rate when the carrier signal is transmitted to a remote receiver; and
   a processor configured to adjust the symbol rate and the coding rate of the carrier signal simultaneously.

27. The system of claim 26, wherein the encoder is further configured to utilize a Forward Error Correction coding format.

28. The system of claim 26, wherein the processor is further configured to adjust a coding rate of the carrier signal such that the data rate of the carrier signal remains substantially equal to the predetermined data rate.

29. The system of claim 28, wherein the processor is further configured to adjust a power level of the carrier signal such that the data rate of the carrier signal remains substantially equal to the predetermined data rate.

30. The system of claim 26, wherein the processor is further configured to adjust simultaneously adjust the power level of the carrier signal.

31. The system of claim 26, further comprising a processor configured to predict a level of compensation of at least one of a coding rate, a modulation factor, a symbol rate, and a power level of the carrier signal necessary to maintain the predetermined data rate by establishing a trajectory of degradation based on feedback from the remote receiver.

32. The system of claim 26, wherein the trajectory of the degradation is based on a location of the remote in a predetermined rain zone.

33. The system of claim 26, wherein the processor is further configured to adjust a modulation factor of the carrier signal such that the data rate of the carrier signal remains substantially equal to the predetermined data rate.

34. The system of claim 33, wherein the processor is further configured to adjust the symbol rate and modulation factor of the carrier signal simultaneously to maintain the data rate of the carrier signal at a level that is substantially equal to the predetermined data rate.

35. The system of claim 34, wherein the processor is further configured to adjust the coding rate simultaneously with the simultaneous adjustment of the symbol rate and modulation factor.

36. A system for maintaining a data rate of each of multiple carrier signals within a telecommunications link, the system comprising:

a modulator configured to modulate a plurality of carrier signals, each carrier signal comprising a single data stream corresponding to the carrier signal;

an encoder configured to encode the plurality of carrier signals;

a bandwidth controller configured to dynamically control a bandwidth of each of the carrier signals among the plurality of carrier signals by changing a symbol rate of one or more carrier signals such that a data rate of the one or more carrier signals remains substantially equal to a predetermined data rate when the one or more carrier signals is transmitted to a remote receiver; and a processor configured to predict a level of compensation of at least one of a coding rate, a modulation factor, the symbol rate, and a power level of the carrier signal necessary to maintain the predetermined data rate by establishing a trajectory of degradation based on feedback from the remote receiver.

37. The system of claim 36, wherein the encoder is further configured to utilize a Forward Error Correction coding format.

38. The system of claim 36, wherein the processor is further configured to adjust a coding rate of one or more carrier signals among the plurality of carrier signals such that the data rate of the one or more carrier signals remains substantially equal to the predetermined data rate.

39. The system of claim 36, wherein the processor is further configured to adjust a power level of the one or more carrier signals among the plurality of carrier signals such that the data rate of the one or more carrier signals remains substantially equal to the predetermined data rate.

40. The system of claim 39, wherein unused bandwidth remains among the plurality of carrier signals.

41. The system of claim 39, wherein all available bandwidth among the plurality of carrier signals is utilized such that at least a portion of available power is unused.

42. The system of claim 41, wherein unused bandwidth remains among the plurality of carrier signals.

43. The system of claim 41, wherein all available bandwidth among the plurality of carrier signals is utilized such that at least a portion of available power is unused.

44. The system of claim 36, wherein the processor is further configured to simultaneously adjust the power level of the one or more carrier signals.

45. The system of claim 36, wherein the trajectory of the degradation is based on a location of the remote in a predetermined rain zone.

46. The system of claim 36, further comprising a processor configured to adjust the modulation factor of one or more carrier signals among the plurality of carrier signals such that the data rate of the one or more carrier signals remains substantially equal to the predetermined data rate.

47. The system of claim 36, wherein the processor is further configured to adjust a coding rate of one or more carrier signals among the plurality of carrier signals such that the data rate of the one or more carrier signals remains substantially equal to the predetermined data rate.

48. The system of claim 36, wherein the processor is further configured to adjust the symbol rate and the modulation factor of the one or more carrier signals simultaneously to maintain the data rate of the one or more carrier signals at a level that is substantially equal to the predetermined data rate.

49. The system of claim 36, wherein the processor is further configured to adjust the symbol rate and the coding rate of the one or more carrier signals simultaneously to maintain the data rate of the one or more carrier signals at a level that is substantially equal to the predetermined data rate.

50. The system of claim 36, wherein the processor is further configured to adjust the coding rate of the one or more carrier signals simultaneously with the simultaneous adjustment of the symbol rate and the modulation factor of the one or more carrier signals.

* * * * *